INVENTOR
Allen M. Penrod
BY
Norman H. Holland
ATTORNEY

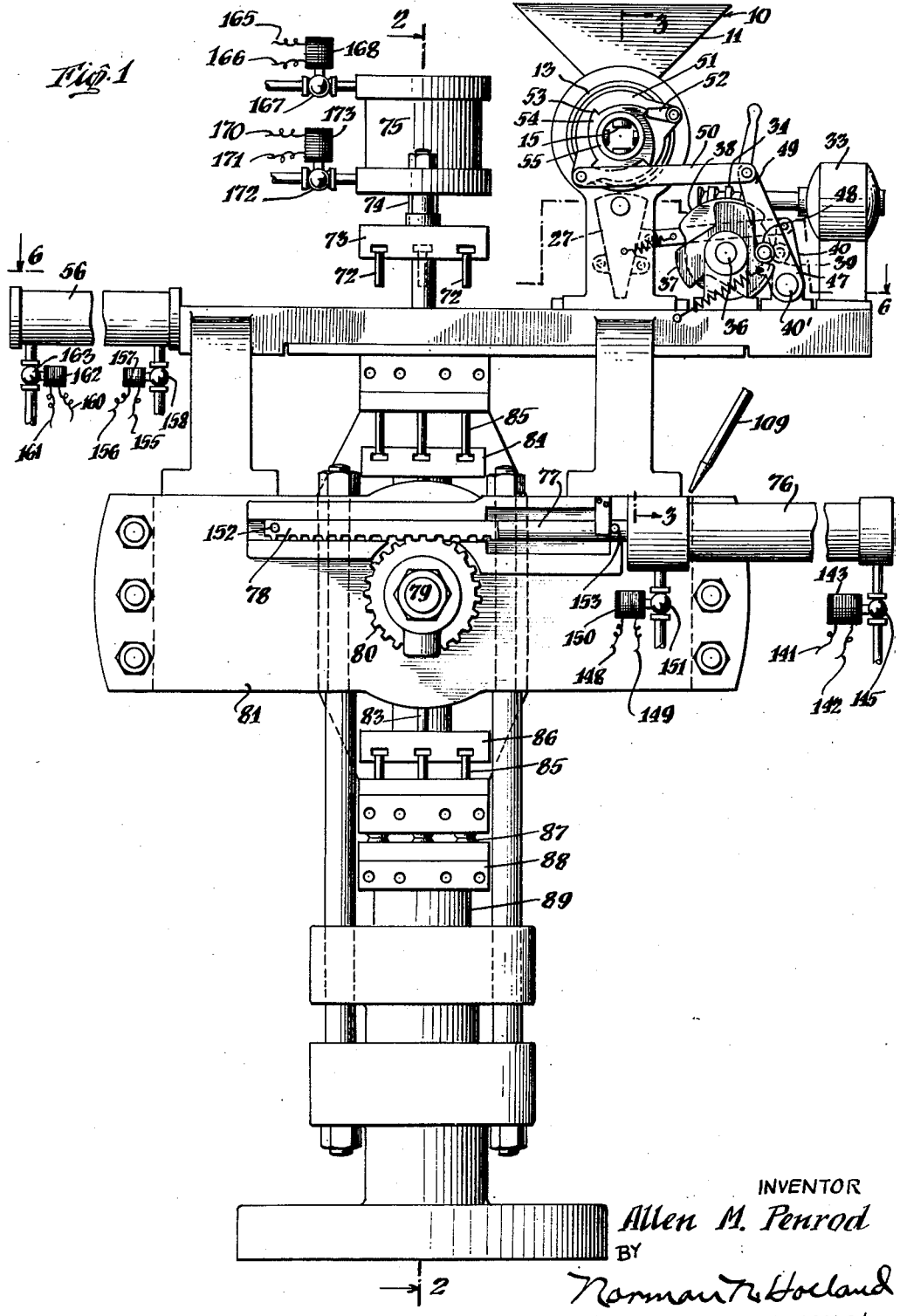

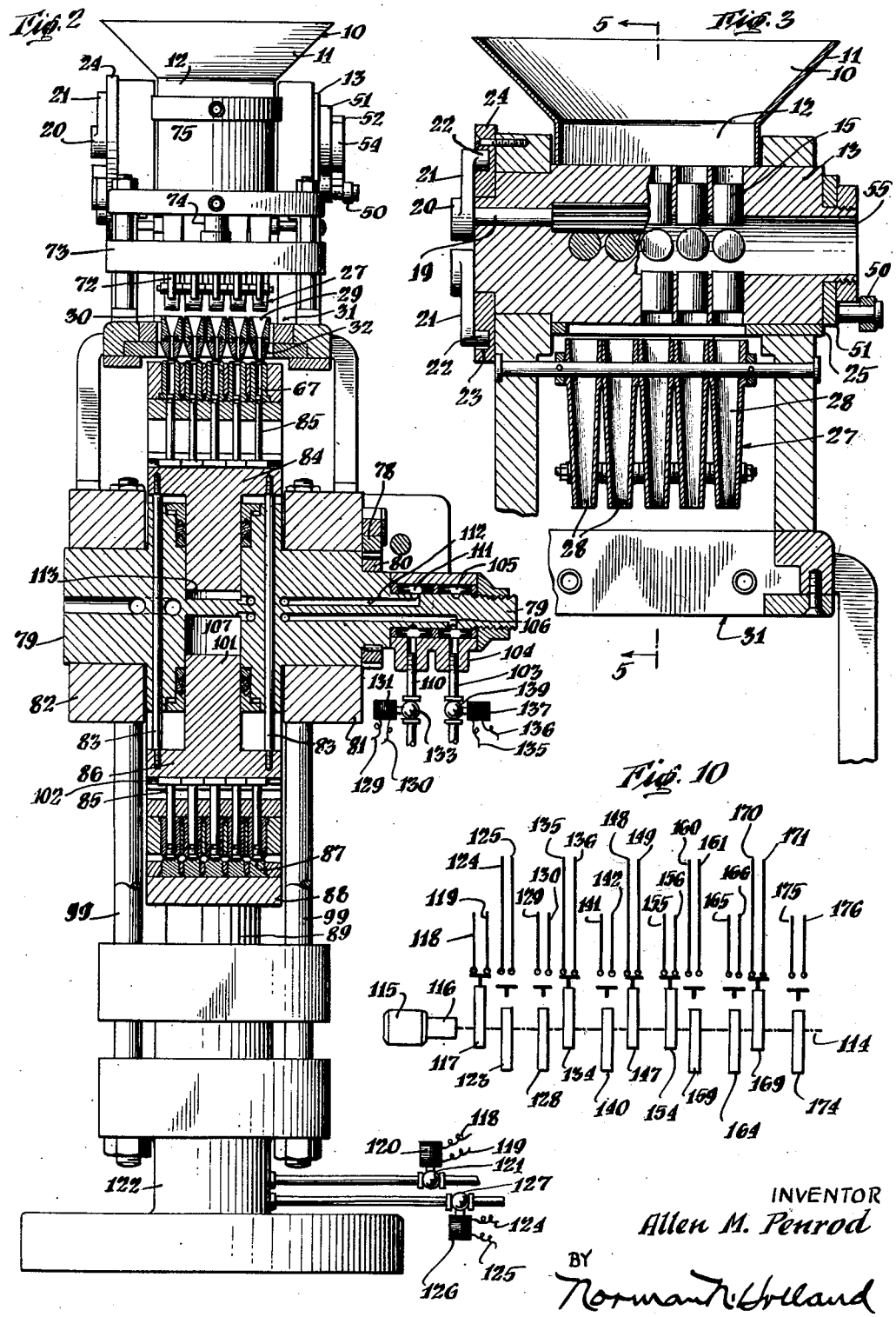

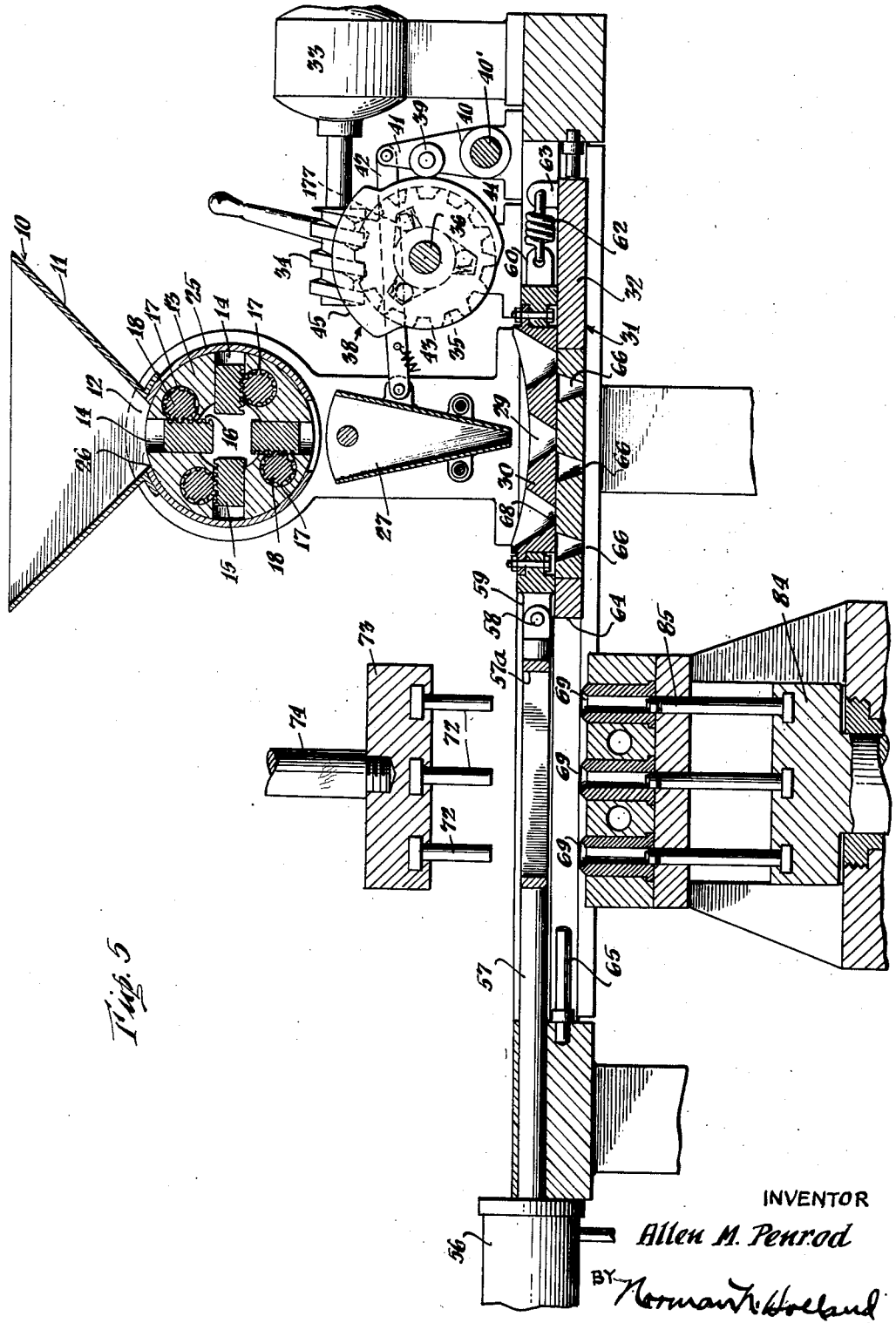

July 3, 1951  A. M. PENROD  2,559,545
MACHINE FOR MOLDING
Filed Aug. 25, 1945  6 Sheets-Sheet 5

INVENTOR
Allen M. Penrod
BY Norman N. Holland
ATTORNEY

July 3, 1951  A. M. PENROD  2,559,545
MACHINE FOR MOLDING
Filed Aug. 25, 1945  6 Sheets-Sheet 6
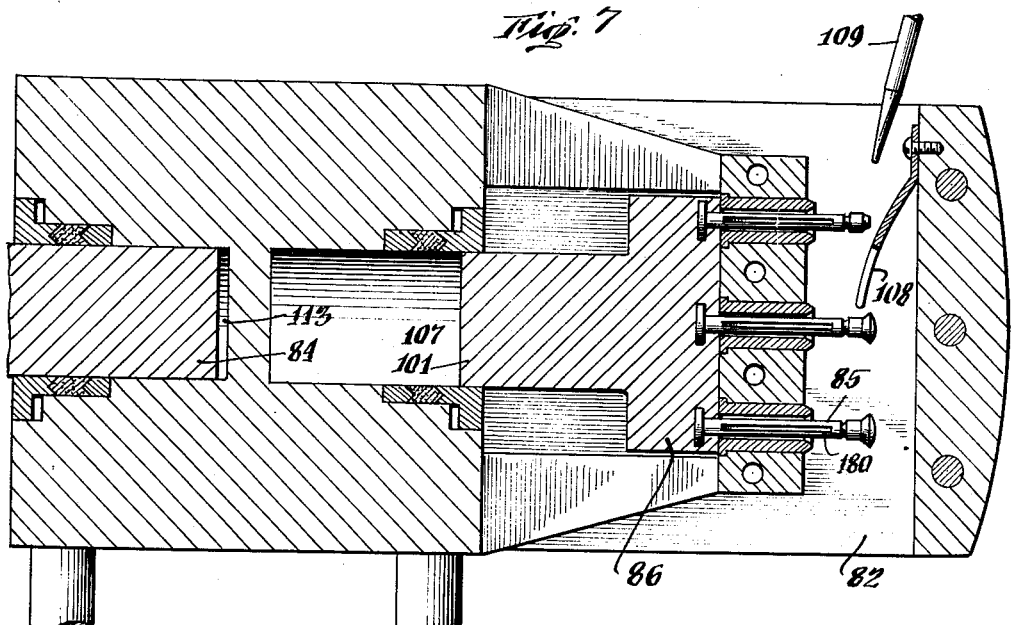
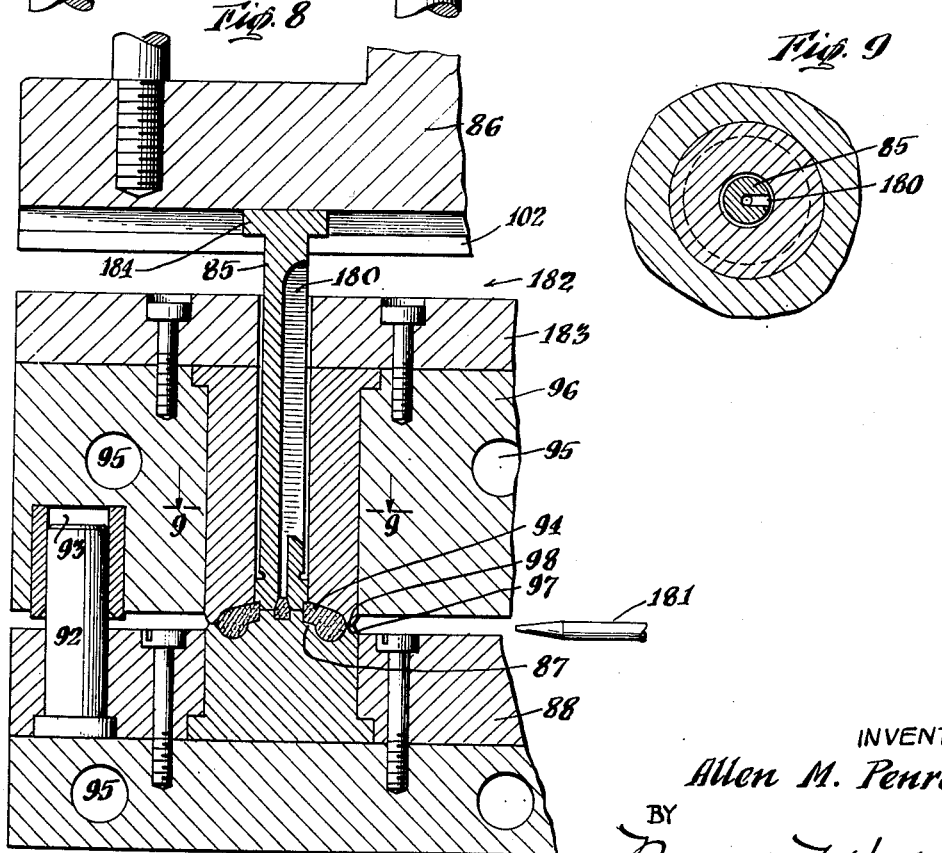
INVENTOR
Allen M. Penrod
BY
Norman F. Holland
ATTORNEY Patented July 3, 1951

2,559,545

UNITED STATES PATENT OFFICE 2,559,545

MACHINE FOR MOLDING

Allen M. Penrod, Federalsburg, Md., assignor to Maryland Plastics, Inc., Federalsburg, Md., a corporation of Maryland Application August 25, 1945, Serial No. 612,609

24 Claims. (Cl. 18—21)

This invention relates to molding devices and molding processes and is herein illustrated in some detail as embodied in a molding device especially adapted to produce commercial types of buttons from either urea or phenolic condensation products but is also adapted for other uses.

One widely used method of producing buttons from such thermo-plastic and thermo-setting compounds has been to form the material, usually a powder, into measured pills or blanks in a pill-forming press, collecting the pills in containers and placing them, one to each button form mold, in a molding press, then pressing and heating the pills by bringing down on them a top press member, holding the pressed pills, now buttons, until cured, removing the top press, removing the buttons from their mold depressions, and then tumbling them to remove flashes or fins from the articles.

Such prior processes have proved slow, require much handling by an operator, and often waste as much as twenty percent or even thirty-five percent of the plastic moldable material. The use of such processes has been made possible by utilizing molds having a large number of cavities therein to reduce the labor cost. Such molds are very expensive and wasteful of molding material as compared with the present machine and method.

According to the present invention the process is greatly speeded up, the manual handling of pills or buttons is eliminated or minimized, the waste is greatly reduced, sometimes to as little as three percent of the material used, and the tumbling operations are correspondingly reduced.

In the form shown the button molding material is shown as deposited in a supply hopper without the need of weighing it, and the material is automatically measured out, formed into pills or blanks, heating begins automatically, and then is carried to the final mold, where final curing is rapidly effected, and the returning pill-forming device automatically strips off the molded buttons ending up ready to be filled with more molding material.

Some of these operations require hydraulic pressures—others an intermittent mechanical drive. Some operations need to be timed to avoid mechanical interference of parts, while others need to be timed to provide for proper curing of the material.

The present invention provides for close interrelation of timing, so that the period required for curing by heat of one lot of buttons may be utilized in preparing or measuring material for another lot of buttons; thus every part of the mechanism is serving a useful function instead of standing idle.

An object of the present invention is to provide an improved automatic machine and method for making molded articles.

Another object of the invention is to provide an improved machine which receives a molding compound in powder form, makes it into pills, delivers the pills to cavities and molds the articles in a continuous operation.

Another object of the invention is to provide a machine which requires a minimum of labor to operate it.

Another object of the invention is to provide a simple automatic machine and method.

Another object of the invention is to provide an improved machine and method which reduce the amount of molding material, thereby reducing the cost of the articles.

Another object of the invention is to reduce the cost of molding articles by reducing the cost of both the labor and material required.

Another object is to provide an accurate measuring and feeding device for moldable material.

Another object is to provide a rugged machine well adapted for molding under heavy pressure.

A further object is to provide for the preliminary forming of pills and automatic delivery thereof to cavities.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a side view of a preferred embodiment of the invention;

Fig. 2 is a vertical end sectional view on the line 2—2 or Fig. 1;

Fig. 3 is a sectional end view of the detail on the line 3—3 of Fig. 1;

Fig. 5 is a sectional view on the line 5—5 of Fig. 3, including additional parts;

Fig. 7 is a sectional side view of a button stripping operation;

Fig. 8 is a sectional side view of the molding operation;

Fig. 9 is a section on the line 9—9 of Fig. 8;

Fig. 10 is a diagrammatic side view of the timing shaft and associated parts.

Figures 4, 11:
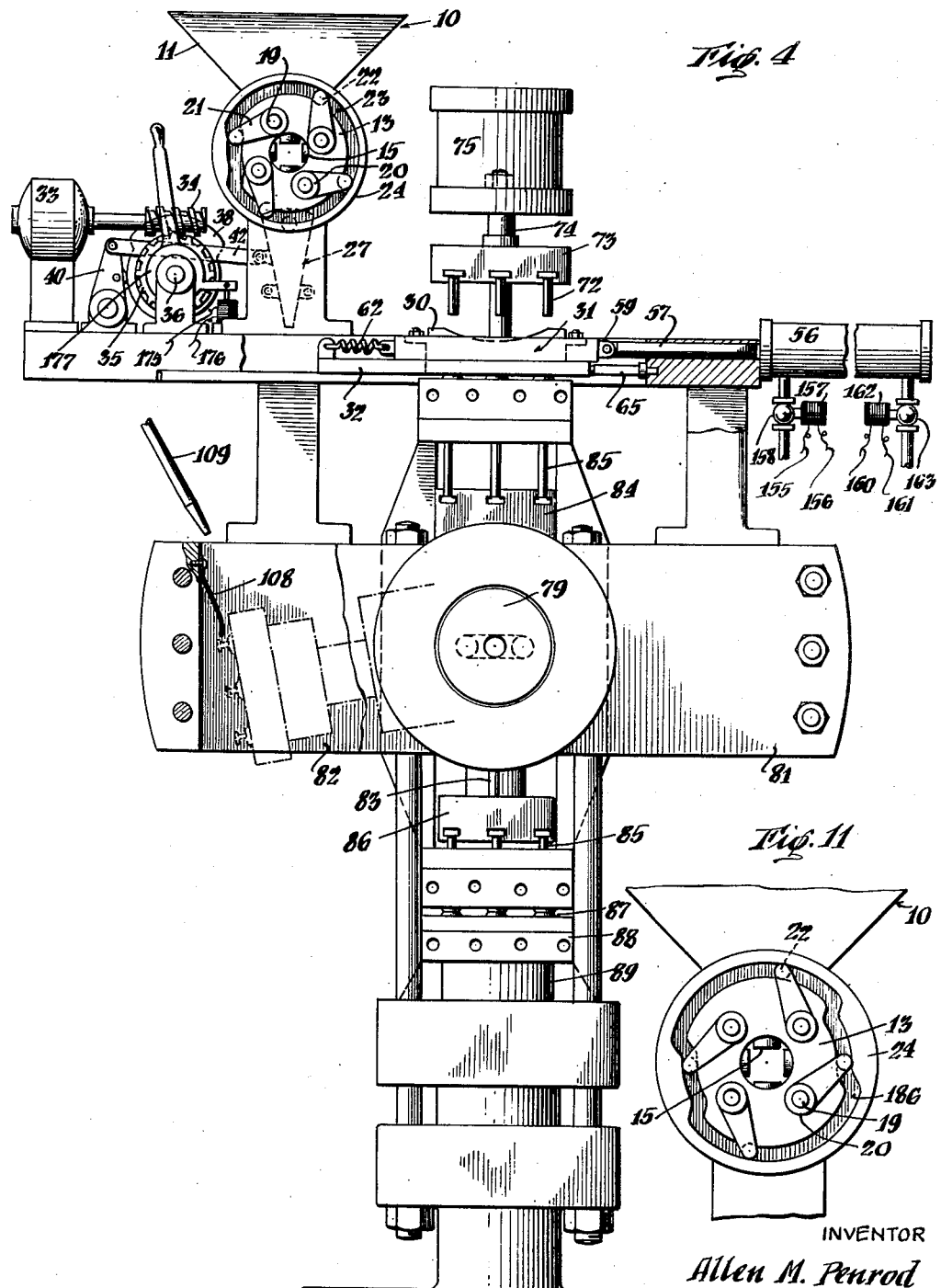
Fig. 4 is a view similar to Fig. 1 but of the opposite side.
Fig. 11 shows an alternative form of cam for feeding moldable material.

In the form shown in some detail, the molding machine includes a hopper 10, shown in section at Fig. 5 with slanting sides 11, which feed thermo-plastic or thermo-setting material downwardly to a constricted outlet 12, closed by a rotating measuring wheel 13. To effect accurate measuring of the material the wheel 13 is shown, Figs. 3 and 5, as a cylinder provided with a series of rows of measuring sockets or bores 14, to feed one socketful for each button molded in a single pressing operation, as will be described in some detail below.

The bores or sockets 14 are shown with movable bottom closures 15 which may be adjusted to vary the amount of moldable material they receive for charging the molds and also are adapted to be variably driven to receive and release or to expel the contained moldable material they have carried away from the hopper 10.

To effect these ends each cylindrical closure 15 is shown as provided with a row of teeth forming an axial row 16 meshing with axial teeth 17 in a drive cylinder 18 which extends along all the bores 14 which receive molding material at one time, and thus moves all the closures 15 of a row identically.

In the form shown in Fig. 3 only five bores 14 and five closures 15 are shown although in many machines a much larger number will be provided. The drive cylinders 18 in Fig. 3 are shown as formed with prolonged axles 19 fastened to the hubs 20 of cam follower arms 21 having followers 22 which ride in a groove 23 of a fixed cam 24, so that the turning of the arms 21 by their followers 22 successively shifts the closures 15 first to an inmost position to receive an over-supply of molding material, then outward a little to be sure of full and uniform measure, and then holds that position until dumped at the bottom into the carriage 31 described below.

It should be pointed out that the hopper 10 is provided at the outlet 12 with curved covers 25 which lie close against the surface of the measuring wheel 13 with the result that the turning of the measuring wheel 13 causes the leading edge 26 of the left hand cover 25 (Fig. 5) to scrape off from each socket 14 any excess material, thus accurately measuring the material to be sent on for later molding.

When the material thus measured is dropped or expelled from the sockets 14 as described above, it falls into an auxiliary hopper 27, divided into sub-compartments 28, one compartment for each socket 14 in an axial row on the wheel 13. Thus each compartment 28 in the auxiliary hopper 27 guides and delivers a charge of material from a socket 14 into a temporary holder or receptacle 29 in a movable plate 30 forming part of a transfer carriage 31 which includes a base plate 32.

The movable plate 30 is normally at rest and the auxiliary hopper 27 is adapted to be shifted to deliver separate charges of material into separate rows of receptacles 29 in the plate 30, there being a separate row of receptacles 29 for each row of molds to be described below, and the rows of sockets 14 each match a row of receptacles 29.

To coordinate the filling of successive rows of sockets 14 with the successive rows of receptacles, the auxiliary hopper 27 is shown as positioned over the rows 29 by the same drive that turns the measuring wheel 13. In the form shown a motor 33 intermittently drives through a worm 34 and worm gear 35, a cam-bearing shaft 36, and cams 37 and 38 on the shaft 36 may be driven by the shaft to drive the wheel 13 and swing the auxiliary hopper 27 in unison, the intermittent drive being described below.

The cam 38 is shown as bearing against a follower 39 on a spring pressed rock arm 40, so that an extension 41 of the rock arm 40 actuates a link 42 pivoted to the extension 41 and to the auxiliary hopper 27 and by dwells 43, 44, 45 on the cam 38 holds the auxiliary hopper 27 successively over the proper rows of receptacles 29 to guide material discharged from a given socket 14 into a given receptacle 29.

The bottom closures 15 are operated at the proper time because a second cam 37 on the shaft 36 actuates a second spring pressed rock arm 47 on the shaft 40' through a follower 48 which bears against the cam 37 and causes an extension 49 of the rock arm 47 to draw on and release a link 50 to oscillate in unison a pawl-carrying plate 51 to intermittently drive the measuring wheel 13 by pawls 52 which engage ratchet teeth 53 in a plate 54 fastened to the projecting end of the shaft 55 of the wheel 13. Thus a single revolution of the shaft 36 causes the revolving of the wheel 13 to successively deposit measured lots of molding material in the proper separate receptacles 29. When all the receptacles 29 have thus received charges of molding material, connections described below cause the carriage 31 to shift the receptacles 29 to deliver their contents to pill-forming position.

The shifting of the carriage 31 is shown as effected by a compressed air cylinder 56 having a piston, not shown, and a piston rod 57 connected by a yoke 57a and a bolt 58 through a forked member 59 (see Fig. 5) pivoted on the movable plate 30. The pulling of the piston rod 57 is shown as adapted to draw the carriage 31 and plate 32 because a lug 60 on the plate 32 draws on a pair of springs diagrammatically shown at 62 to pull the plate 32 by ears 63 in which the springs 62 are anchored.

In the form shown the drawing of the piston rod 57 carries both plates 30 and 32 to the left, in Fig. 5, until the end 64 of the plate 32 strikes adjustable fixed stops 65 in such a position that openings 66 in the plate 32 (which have been out of alignment with the receptacles 29) stop over receiving openings 67 at a pill-forming position.

The motion of the piston rod 57 continues until the bottom openings 68 of the receptacles 29 come over the openings 66 and allow the molding material to drop out of the receptacles 29 into pill-forming openings 69 (Fig. 5) which constitute part of a turret mechanism described in more detail below. Then the carriage 31 is returned by the piston rod 57 to its Fig. 5 position, ready for receiving a second set of batches of molding material. The measuring wheel is shown as held at rest during the back and forth movement of the carriage 31, being for this purpose controlled as described below.

When the carriage 31 has returned to its Fig. 5 position, a set of compacting rods 72 descends into the set of pill-forming openings 69 and compacts into pills the molding material which has been deposited in them so that the material will remain in the openings 69 during the inversion of the turret which will be described a little later.

At this point it may be explained that the compacting rods 72 are shown as mounted in a head 73 under which the carriage 31 may pass, and the head 73 is shown (Figs. 1 and 4) as the head of a piston rod 74 which forms part of a hydraulic press structure with a cylinder 75 adapted to positively push the rods 72 up and down at times controlled by a mechanism described below. When the molding material has been thus compacted into pills, the rods 72 are withdrawn.

The pill-forming openings 69 may now be safely inverted and the turret of which they form a part may be turned or inverted. To effect this inversion, the device is shown as provided with a cylinder 76 having a piston which may be air or oil operated to drive in or out a rack 78 extending from the piston rod 77 (Fig. 1) and thus turn the horizontal axle 79 of the turret structure by a spur gear 80 with which the rack 78 meshes because the gear 80 is on the axle 79.

The axle 79 is shown (Fig. 2) as journalled in fixed bearings 81, 82 and the axle serves as a support for slidable tie rods 83 which pass through it and which unite a piston head support 84 for one set of pressure plungers 85 in the openings 69 and a second piston head support 86 for a second set of plungers 85 in a second set of openings 69. The pill-forming openings of Fig. 5 show the plungers 85 in their lower position so the openings 69 may receive and contain the molding material in the Fig. 5 position.

After the pills have been compacted as described above and the plungers 72 have been withdrawn, the rack 78 is actuated to turn the axle 79, its tie rods 83, and the piston heads 84, 86, each with its plungers 85, so as to invert the plungers 85 and their pill-forming openings 69 until the openings which faced the plungers 72 point downward and face molding cavities 87 in the head 88 of a hydraulic press piston 89.

Normally the cavities 87 stand only two or three inches away from the ends of the openings 69 when facing the openings, just enough to completely clear parts during the turning of the turret by its axle 79. When the rack 78 has brought the turret to a rest the hydraulic press piston 89 rises, accurately centering the facing parts of the mold by one or more pins 92 entering suitable guide openings 93 (Fig. 8), and the button 94 is pressed to shape out of the material delivered to the openings 69 at the top of the device.

To increase efficiency and reduce the time of molding, heating of the material in the openings is usually begun when the molding material enters the openings 69 and is continued thereafter. This heating is shown as effected by steam openings 95 or electric elements in the metal body 96 which supports the tubes in which are formed the openings 69.

The molding material in the openings 69 begins to cure, in many cases, not later than the descent of the pill-forming plungers 72, and continues to respond to heat so that it may be three-quarters cured when the plunger 85 rises to bring the edges 97 of the cavity molds 87 against the edges 98 of the mold members carried in the turret.

Since the faces 97 and 98 are held together by hydraulic pressure exerted against the tension of struts 99 (Fig. 2) which hold the hydraulic cylinder 122 of the piston 89 to the bearing 82, the mold faces 97 and 98 are held in practically rigid contact while the heating is effected, and while the plunger 85 may be forced down by hydraulic pressure against the end 101 of the piston head 86 of the manifold head 102 in which the plungers 85 are carried.

The hydraulic pressure on the piston head 101 (Fig. 2) is obtained by fluid, usually oil, entering a conduit 103 in a collar 104 around the shaft 79 which feeds oil through a packed annular passage 105 so that the oil may pass through a conduit 106 into the chamber 107 above the piston head 101. The pressing down of the piston head 86 drew, by the rods 83, the head 84 downward, thus withdrawing the upper plungers 85 (Fig. 2) down out of the upper openings 69. Thus the pressing of pills into buttons at the mold cavities 87 withdrew the upper plungers 85 to open the upper openings 69 to receive the molding material.

At about the time the upper plungers 85 began to be withdrawn, the carriage 31 started to the left in Fig. 5, dumped the molding material from the receptacles 29 into the openings 69 and started back to its right-hand position. The plungers 72 came down and compacted the molding material into pills and were withdrawn while the mold edges 97 were still in contact with the edges 98. While the auxiliary hopper 27 was filling the receptacles 29, the piston 89 withdrew the edges 97, the rack 78 began to turn the turret backwardly, swinging sideways the plungers 85 with the molded buttons still sticking to them.

As soon as all the plungers 85 were clear of the mold edge 97 and the centering pin 92 was clear of the opening 93, this operation of the rack 78 began, and then the plungers 85 were thrust out by the plunger 86 beyond the edges 98 (see Fig. 7) so as to carry the buttons on their ends out in a path which intercepted a button-stripping fork 108 so that the turning of the turret stripped the button by catching the tines of the fork 108 behind the projecting button edges, being assisted if desired by an air jet 109.

Then the oil drained away from the piston 86, withdrawing the stripped plungers 85 within their openings 69 ready to receive molding material from the carriage 31 and completing one cycle of molding. The back swinging of the turret from molding to stripping position carried in the opposite direction the openings 69 and plungers 85 at the other side of the turret, so that a second set was molded while the empty openings 69 were being filled.

To effect the operation of the two sets of plungers 85 to mold buttons, the piston 84 is shown as hydraulically operated by oil entering a pipe 110 connected by a packed annular passage 111 to a conduit 112 leading to a chamber 113 behind the piston 84. It will be noted that the plungers 85, 85 occupy successively three positions in the rotation of the turret: (1) a withdrawn position; (2) a flush molding position; and (3) a projecting stripping position.

The various inter-related operations of the various parts may be so timed that the ten or fifteen seconds needed to finish the curing of the molded buttons at the cavities 87 is utilized for the filling of the empty pill-forming openings 69 from the carriage 31 and for compacting the material therein. The fraction of a minute while the turret is turning to carry the pills in the openings 69 down to the cavities 87 is utilized to fill the temporary receptacles 29 with loose molding material from the measuring sockets 14, and in part, in ending and then beginning travel of the carriage 31.

To effect these and other operations in proper order a timing shaft 114 is diagrammatically shown as driven by a small independent motor 115 through a reduction gear 116. The shaft 114 is shown as carrying a contact control cam 117 connected by a circuit 118, 119 to an electro-magnet 120 which operates a control valve 121, so as to control the admission of oil under pressure to the cylinder 122 beneath the hydraulic piston 89, and as also carrying a contact control arm 123, connected by a circuit 124, 125 to the electromagnet 126 which operates the valve 127 so as to control the release of oil from the cylinder 122 and let the cavities 97 drop.

The shaft 114 is also shown as carrying a contact control cam 128, connected by an electric circuit 129, 130 to an electro-magnet 131 to operate the valve 133 to admit oil under pressure to the conduit 110 or release it therefrom.

The shaft 114 is also shown as carrying a contact control cam 134 connected by a circuit 135, 136 to an electro-magnet 137 to operate the valve 139 to admit oil under pressure to the conduit 103 or release it therefrom, so that the cams 128, 134 between them control the coupled plungers 84, 86.

The shaft 114 is also shown as carrying a contact control cam 140 connected by a circuit 141, 142, to operate (Fig. 1) an electro-magnet 143 to operate the valve 145 to admit air under pressure to the conduit 146 of the air cylinder 76 which pushes the rack 78 to the left in Fig. 1, or to release the air.

The shaft 114 is also shown as carrying a contact control cam 147 connected by a circuit 148, 149 to operate an electro-magnet 150 to operate the valve 151 to admit air under pressure to, or release air from, the cylinder 76 to rotate the turret one way or the other, a half revolution, until arrested by a stop 152 or 153 as the case may be.

The shaft 114 is also shown as carrying a contact control cam 154 connected (see Figs. 1 and 4) by a circuit 155, 156 to operate the magnet of a valve 158 to admit air under pressure to, or release it from, the cylinder 56; that is, to return the carriage 31 to pill-forming position or to release it.

The shaft 114 is also shown as carrying a contact control cam 159 connected by a circuit 160, 161 to operate the magnet of a valve 163 to admit air under pressure to the cylinder 56 to return the carriage 31 to filling position or to release it for operation through the valve 158.

The shaft 114 is also shown as carrying a contact control cam 164 to control the circuit 165, 166 which operates a valve 167 by a magnet 168 to control the admission of oil to cylinder 75 to compress the pills by the plunger 72. The shaft 114 is also shown as carrying a contact control cam 169 to control the circuit 170, 171, which operates a valve 172 by a magnet 173 to admit oil to raise the plunger 74 of the cylinder 75 to permit the carriage 31 to deliver molding material to the pill openings 69, and to permit the turret to turn.

The shaft 114 is also shown as carrying a contact control cam 174 to control a circuit 175, 176 to control the one revolution clutch 177 which intermittently drives the clutches 37 and 38 from the shaft 36.

Figure 6:
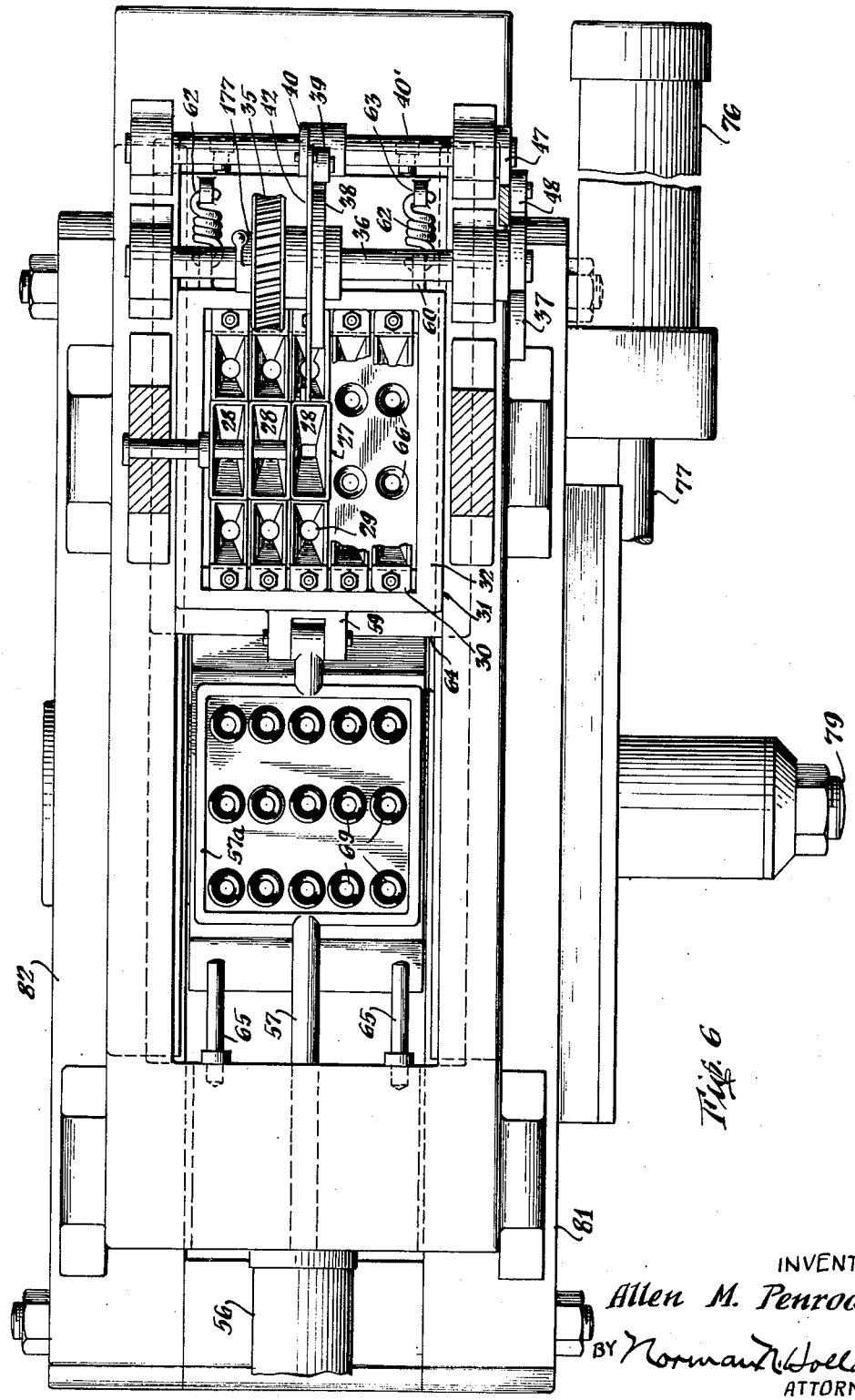
Fig. 6 is a sectional plan view on the lines 6—6 of Fig. 1.

To effect this one-revolution intermittent drive, the circuit 175, 176 is shown as operating a clutch control lever 178 (Figs. 6 and 5 and 4) to allow one revolution of the clutches 37 and 38 while the carriage 31 is at rest.

The shaft 114 is thus essentially a timing shaft which coordinates the operation of making buttons in the following cycles:

Molding material is placed in the hopper 10 at convenient intervals while the motors 33 and 115 are running, the latter driving the timing shaft 114.

The shaft 114 turns the shaft 36 to turn the cam 37 to oscillate the ratchet 52 and thus rotate wheel 13 a step at a time, bringing its rows of measuring sockets 14 successively over the rows of temporary receptacles 29. When a socket 14 is directly over a receptacle 29, one of the dwells 43, 44, 45, on the cam 38 holds the auxiliary hopper 27 over its stationary row of receptacles to ensure accurate dumping of the socket 14 contents.

When the auxiliary hopper 27 is being moved from one position over one row of receptacles 29 to another row the cam 37 is returning its pawl 52 on an idle stroke, and vice versa.

When the cams 37, 38 have completed the filling of the receptacles 29, the cylinder 56 draws the carriage 31 to the left in Fig. 5 until the openings 66 are over the mold openings 69, and then the movable plate 30 travels on, dumping the molding material into the mold openings 69. Heat may be applied at this time to begin the curing incipiently as by passages 95.

Then the cylinder 56 moves the carriage 31 back, the compacting rods 72 descend and compact the material, and rise up.

Then the turret is turned by the rack 77 to carry the filled openings 69 down and bring up the other set of openings 69 while the temporary receptacles 29 are being refilled.

When the filled openings 69 reach the bottom and face the mold cavities 87 the plunger 89 rises and the material in the openings is shaped and receives its final cure, any excess being squeezed out into a small recess 180 in each plunger 85. The recess may be as little as $^{50}/_{1000}$ of an inch across.

Then the plungers 85 move slightly inwards, breaking away the molded buttons from the cavities 87, and thereafter the turret rotates backwardly carrying upwardly the buttons which still adhere to the plunger 85, usually held in part by the pins which lie within the recess 180.

Halfway up the buttons are stripped off by a button stripping fork 108, the buttons for this purpose being projected outwardly by projection of their plungers 185 on the upward movement so their path intercepts the fork 108, while the downwardly turning opposite end of the turret is withdrawn inwardly to clear the fork on its downward path. The air jet 109 may assist the fork, and the mold cavities may also be cleaned by an air jet 181.

It will be noted that the recesses 180 widen out some distance back of the mold face and extend back to the opening 182 between the cross plate 102 of turret and the plunger head 86 in which the enlarged head 184 of the rods 85 are held, so that excess material may be forced out and fall away while the turret turns.

Fig. 11 shows an alternate form of cam 186 to replace cam 23, so that by using cam 186 the closures 15 may be operated at the bottom of their travel to positively expel the molding material from the sockets 14 so that it falls into the receptacles 29 even though it has tended to stick in the sockets 14.

The timing shaft is also adapted to control the heating of the mold, if desired, so that, if preferable, additional heat may be applied at any point in the filling and molding cycle and heat may be shut off at any other position in the filling and molding cycle.

It will be noted that the step in the molding operation shown in Fig. 8 began with the closing of the faces 97 against the faces 98, and that thereafter; that is, after the metal faces are firmly in contact, the rods 85 force down the pills which have been already formed in the receptacle 69, thus eliminating most or all of the "flash" or fins which form in ordinary molding. This structure and operation save most or all of the material ordinarily lost, and that saving runs between twenty and thirty-five percent.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a device of the class described, including a set of rows of mold elements, the combination of a feeding carriage adapted to be moved over the elements and having pockets to fill all elements simultaneously, a hopper, a revoluble cylinder forming the bottom of the hopper and including a measuring bore for each row, a set of funnels pivotally mounted adjacent its upper end and positioned to receive the measured material from the bores, and means operatively connecting the revoluble cylinder with the funnels effective to thus co-ordinately shift the lower ends of said funnels from one set of pockets to the next to successively fill all sets of pockets.

2. In a device of the class described, the combination with a hopper, of a revoluble cylinder forming the bottom of the hopper and having sets of measuring bores, sets of receptacles spaced from the hopper, a set of funnels, means for moving said funnels to different positions corresponding to said sets of receptacles thereby to deliver material to the different sets of receptacles, and a single drive motor operatively connected with the cylinder for revolving it and with the funnels for moving them to said different positions, whereby upon actuation of the drive motor the different sets of bores may deliver material to said different sets of receptacles.

3. In a device of the class described, the combination with a turret including a first mold element and an oppositely disposed second mold element, of a feeding device, means for moving said feeding device into and out of proximity with said first mold element for feeding moldable material to said first mold element, a normally removed compacting device, means for moving said device to compact material in said first mold element after the feeding device has left the proximity of said first mold element and while said element remains in feeding position, a pressure head against which material in the second mold element is formed, a press for moving said pressure head from inoperative to operative position while the turret is at rest, article-forming members associated with each of and movable with respect to each of said first and second mold elements, and a second press operatively connected with the turret and with said article-forming elements for moving said article-forming elements and holding them during forming of articles.

4. In a device of the class described, the combination with a pair of mold elements forming part of a turret, of rods forming bottom portions of each of said mold elements, press means rotatable with said turret having movable portions connected with said rods, movement of one of said press portions serving to project the rods of one of said pair of mold elements and movement of another of said press portions serving to withdraw the rods of another of said pair of mold elements, and means common to both of said press portions for moving them.

5. In a device of the class described, the combination with a pair of mold elements forming part of a turret, of a device for measuring and dispensing material for feeding to the turret, a feeding device, means for moving said feeding device from the measuring device to one of the pair of mold elements for carrying moldable material to one of the pair of mold elements and for returning it from said mold element to a position adjacent said measuring device, a compacting device, means for moving said compacting device on said return into individual molds of one of said pair of mold elements to compact the material therein, a forming device, means for moving said forming device into position against another of said pair of mold elements to assist in forming material therein, movable rods within each of the individual molds of the mold elements for supporting material in said individual molds, a single device for operating the rods within the pair of mold elements, and a pair of additional devices for operating the compacting device and the forming device.

6. In a device of the class described, the combination of a single mold-closing means, a plurality of devices each having a molding recess therein and each adapted to cooperate with said single mold-closing means to form a molding cavity, a rod-like member projecting into each of said molding recesses at all times, means for presenting said devices one at a time to said single mold-closing means and for bringing them together to form said molding cavity, means for thereafter moving the rod-like member of said presented device further into its molding recess to thereby decrease the volume of the molding cavity, and means for retracting from the molding recess of another of said devices a rod-like member thereof.

7. In a device of the class described, the combination of a single mold-closing means, a pair of devices each having a molding recess therein and each adapted to cooperate with said single mold-closing means to form a molding cavity, a rod-like member projecting into each of said molding recesses at all times, rotatable means for alternately moving said devices into and out of registry with said single mold-closing means, means for thereafter moving the mold-closing means into contact with a registering one of said molding recess devices to form said molding cavity, means for subsequently moving the rod-like member of said registering device further into its molding recess to thereby decrease the volume of the molding cavity, and means for retracting from the molding recess of a non-registering device a rod-like member thereof.

8. In a device of the class described, the combination of a single mold-closing means having a plurality of molding depressions therein, a pair of devices each having a plurality of molding recesses therein and each adapted to cooperate with said depressions of the single mold-closing means to form molding cavities, rod-like members projecting into each of said molding recesses at all times, rotatable means for alternately moving said devices into and out of registry with said single mold-closing means, means for thereafter bringing together the mold-closing means and a registering one of said molding recess devices to form said molding cavities, means for subsequently moving the rod-like members of said registering device simultaneously further into their molding recesses to thereby decrease the volumes of the molding cavities, and means for retracting simultaneously from the molding recesses of a non-registering device the rod-like members thereof.

9. In a device of the class described, the combination of a single mold-closing means, a plurality of devices each having a recess therein and each adapted to cooperate with said single mold-closing means to form a molding cavity, a rod-like member projecting into a portion of each of said recesses at all times, means for presenting the recess of said devices one at a time to said single mold-closing means and for bringing together a said device and said mold-closing means to form said molding cavity, means for thereafter moving the rod-like member of a presented recess further into its recess to thereby decrease the volume of such recess, and means for retracting from the recess of another of said devices a rod-like member thereof.

10. In a device of the class described, the combination of a single mold-closing means, a plurality of devices each having a recess therein and each adapted to cooperate with said single mold-closing means to form a molding cavity, a rod-like member projecting into a portion of each of said recesses at all times, means for presenting the recess of said devices one at a time to said single mold-closing means and for bringing together a said device and said mold-closing means to form said molding cavity, means for thereafter moving the rod-like member of a presented recess further into its recess to thereby decrease the volume of such recess, and means for subsequently moving said latter mentioned rod-like member to project an inner end thereof beyond an end of said recess.

11. In a device of the class described, the combination of a single mold-closing means, a plurality of devices each having a recess therein and each adapted to cooperate with said single mold-closing means to form a molding cavity, a rod-like member projecting into a portion of each of said recesses at all times, means for presenting the recess of said devices one at a time to said single mold-closing means and for bringing together a said device and said mold-closing means to form said molding cavity, means for thereafter moving the rod-like member of a presented recess further into its recess to thereby decrease the volume of such recess, and means for feeding moldable material to the recess of a device which is not presented to said mold-closing means.

12. In a device of the class described, the combination of a single mold-closing means, a plurality of devices each having a recess therein and each adapted to cooperate with said single mold-closing means to form a molding cavity, a rod-like member projecting into a portion of each of said recesses at all times, means for presenting the recess of said devices one at a time to said single mold-closing means and for bringing together a said device and said mold-closing means to form said molding cavity, means for thereafter moving the rod-like member of a presented recess further into its recess to thereby decrease the volume of such recess, a feeding device movable into and out of position over one of said plurality of devices which is not presented to the mold-closing means, and means for moving said feeding device into and out of proximity with said non-presented recess.

13. In a device of the class described, the combination of a single mold-closing means, a plurality of devices each having a recess therein and each adapted to cooperate with said single mold-closing means to form a molding cavity, a rod-like member projecting into a portion of each of said recesses at all times, means for presenting the recess of said devices one at a time to said single mold-closing means and for bringing together a said device and said mold-closing means to form said molding cavity, means for thereafter moving the rod-like member of a presented recess further into its recess to thereby decrease the volume of such recess, means for feeding moldable material to the recess of a device which is not presented to said mold-closing means, and means for compacting moldable material in a said recess prior to presentation thereof to said mold-closing means.

14. In a device of the class described, the combination of a rotatable turret, a pair of mold elements spaced angularly from each other on said turret, rods forming bottom portions of each of said mold elements, rod actuating means rotatable with said turret having movable portions connected with said rods of each of said mold elements, and means operatively interconnecting said movable portions whereby actuation of said rod actuating means serves to project the rods of one of said pair of mold elements further into said mold elements during molding and to retract the rods of another of said pair of mold elements.

15. In a device of the class described, the combination of a rotatable turret, a pair of mold elements spaced angularly from each other on said turret, rods forming bottom portions of each of said mold elements, rod actuating means having movable portions connected with said rods of each of said mold elements, and means operatively interconnecting said movable portions whereby actuation of said rod actuating means serves to project the rods of one of said pair of mold elements further into said mold elements during molding and to retract the rods of another of said pair of mold elements.

16. In a device of the class described, the combination of a movable support, a pair of mold elements spaced angularly from each other on said movable support, rods forming bottom portions of each of said mold elements, rod actuating means having movable portions connected with said rods of each of said mold elements, and means operatively interconnecting said movable portions whereby actuation of said rod actuating means serves to project the rods of one of said pair of mold elements further into said mold elements during molding and to retract the rods of another of said pair of mold elements.

17. In a device of the class described, the combination of a movable support, a pair of mold elements spaced angularly from each other on said movable support, rods forming bottom portions of each of said mold elements, actuating means for moving said rods to and fro carried by and movable with said movable support having portions connected with said rods, movement of said latter mentioned portions serving to alternately project and withdraw the rods of said pair of mold elements, and means carried by said movable support for operating said actuating means.

18. In a device of the class described, the combination of a movable support, a pair of mold elements spaced angularly from each other on said movable support, rods forming bottom portions of each of said mold elements, reciprocable means on and movable with said movable support having portions connected with said rods, a common connection for said latter mentioned portions, movement of said latter mentioned portions serving to project the rods of one of said pair of mold elements and to withdraw by such connection the rods of another of said pair of mold elements, and means for moving said reciprocable means.

19. In a device of the class described including a molding device and a delivery means adapted to deliver material to the molding device, a hopper for moldable material, means below said hopper for receiving moldable material therefrom including a bore in which material may be measured, a movable member forming a bottom of said bore, said member being movable longitudinally of said bore to vary the volume thereof, means for supporting said movable member at a position adjacent a lower portion of the bore, means for supporting said movable member at a higher portion of said bore while the bore is in communication with said hopper, and means for moving said movable member from said lower portion to said higher portion while said bore is in communication with said hopper.

20. In a device of the class described including a molding device and a delivery means adapted to deliver material to the molding device, a hopper for moldable material, means below said hopper for receiving moldable material therefrom including a plurality of bores in which material may be measured, movable members forming bottoms of said bores, said members being movable longitudinally of said bores to vary the volumes thereof, means for supporting each of said movable members at a position adjacent lower portions of the bores, means for supporting said movable members at higher portions of said bores while the bores are in communication with said hopper, means for moving said movable members from said lower portions to said higher portions while said bores are in communication with said hopper, and means for transferring said bores to a material-discharging position subsequent to positioning of the movable members at said higher portions of the bores.

21. In a device of the class described, the combination of a mold element having a recess, an additional mold element having a recess, at least one of said mold elements being movable into closed relationship with the other to place said recesses in registry and form a marginally closed cavity, one of said elements having a passageway communicating with the recess thereof and said passageway having a substantially uniform bore portion adjacent said recess, a plunger in said passageway having an end portion with an exterior conforming generally to said uniform bore and slidable therealong and having an aperture therein adapted to receive excess molding material from said cavity, and means for moving said plunger to and fro and sliding said exterior portion along said uniform bore portion.

22. A device as claimed in claim 21, in which said plunger is of reduced cross sectional dimension other than at said exterior portion.

23. A device as claimed in claim 21, in which said plunger has a discharge opening extending from said aperture to a side portion of the plunger.

24. In a device of the class described, the combination of a mold element having a recess, an additional mold element having a recess, at least one of said mold elements being movable into closed relationship with the other to place said recesses in registry and form a marginally closed cavity, one of said elements having a passageway therethrough communicating with the recess thereof and said passageway having a substantially uniform diameter bore portion adjacent said recess, a plunger in said passageway having a cylindrical shoulder adjacent one end thereof with an exterior diameter conforming generally to said uniform bore and slidable therealong and having a longitudinally extending aperture therein adapted to receive excess molding material from said cavity, and means operatively connected with an opposite end of said plunger for moving said plunger to and fro and sliding said shoulder along said uniform bore portion.

ALLEN M. PENROD.

REFERENCES CITED

The following references are of record in the file of this patent:

UNITED STATES PATENTS

| Number | Name | Date |
|---|---|---|
| 228,017 | Aston et al. | May 25, 1880 |
| 239,357 | Williamson | Mar. 29, 1881 |
| 741,488 | Hale | Oct. 13, 1903 |
| 816,374 | Pratt | Mar. 27, 1906 |
| 888,412 | Thomson | May 19, 1908 |
| 1,238,930 | Barbieri | Sept. 4, 1917 |
| 1,473,590 | Wallace | Nov. 6, 1923 |
| 1,731,240 | Apfelbaum | Oct. 15, 1929 |
| 1,991,706 | Seabury | Feb. 19, 1935 |
| 2,052,061 | Toelke | Aug. 25, 1936 |
| 2,212,483 | Soubier | Aug. 20, 1940 |
| 2,228,614 | Soubier et al. | Jan. 14, 1941 |
| 2,256,081 | Farley | Sept. 16, 1941 |
| 2,287,675 | Fair et al. | June 23, 1942 |
| 2,332,938 | Schmidberger | Oct. 26, 1943 |
| 2,347,971 | Sayre | May 2, 1944 |
| 2,357,252 | Sayre | May 8, 1945 |